April 10, 1928.  1,665,366
F. JEHLE
LUBRICATION SYSTEM FOR INTERNAL COMBUSTION ENGINES
Filed April 26, 1925
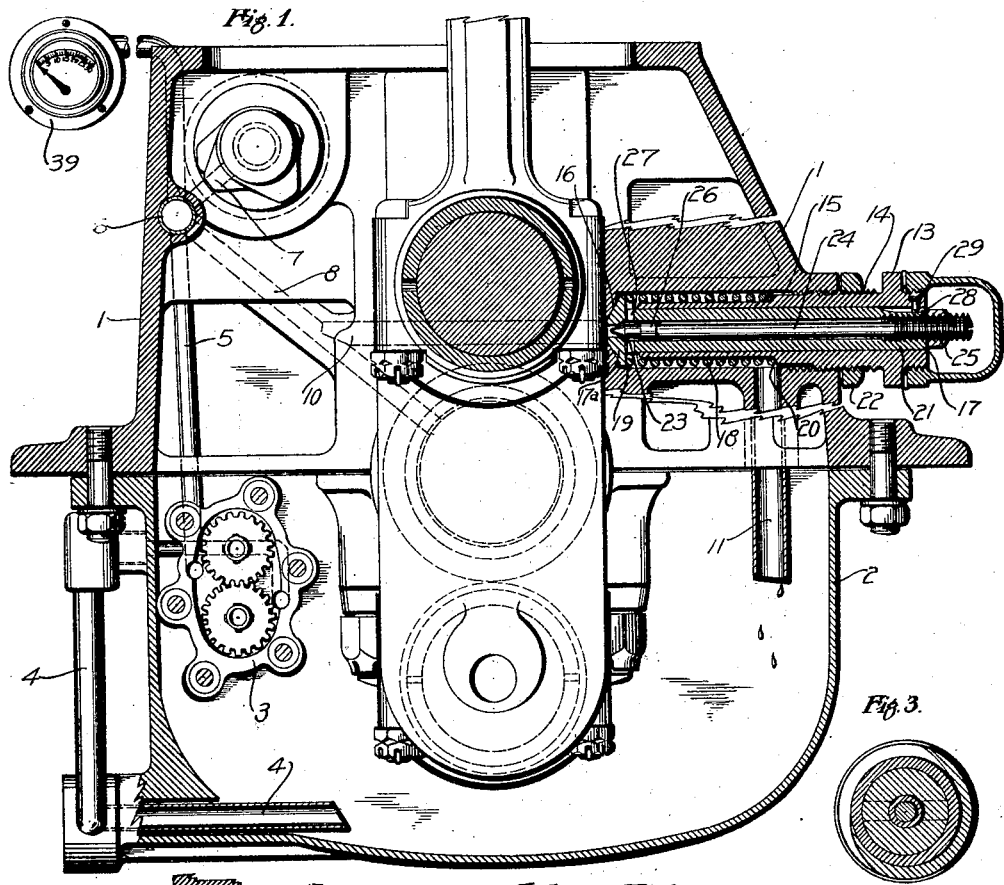
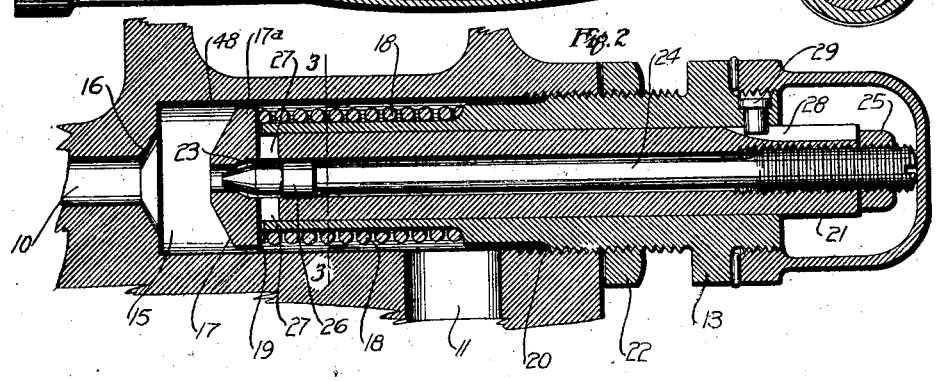
INVENTOR
FERDINAND JEHLE
BY
ATTORNEY Patented Apr. 10, 1928.

1,665,366

UNITED STATES PATENT OFFICE.

FERDINAND JEHLE, OF CLEVELAND HEIGHTS, OHIO, ASSIGNOR TO THE WHITE MOTOR COMPANY, OF CLEVELAND, OHIO, A CORPORATION OF OHIO.

LUBRICATION SYSTEM FOR INTERNAL-COMBUSTION ENGINES.

Application filed April 26, 1926. Serial No. 104,649.

This invention relates to lubricating apparatus and particularly to lubricating apparatus adaptable for use in the lubricating systems of automotive engines.

The invention has a particular use in lubricating systems for automotive engines of that type wherein the oil is forced under pressure to the engine bearings, and wherein, unless precautions are taken, such oil pressure may rise to values which will cause an excessive supply of lubricant to be delivered to those portions of the engine communicating with the combustion chamber thereby causing carbonization and over-lubrication of the cylinders. Moreover excessive oil pressure may result in the breaking of the gauge provided for the purpose of indicating the oil pressure in the system.

An object of the invention is to accomplish the regulation of pressure in the lubricating system of an automotive engine in a highly efficient manner.

Another object of the invention is to accomplish the regulation of the oil pressure in the lubricating systems supplying lubricant to the working parts of an automotive engine, so that with an acceleration of engine speed the oil pressure may increase up to a maximum safe value, which, when attained, is never exceeded at any speed of the engine.

Another object of the invention relates to the provision of a suitable mechanism for the efficient control of the lubricant pressure, which mechanism will be accessible for adjustment and repair.

Another object of the invention is to provide a mechanism of the type to which the invention relates, whereby the same may be adjusted before use to respond at different values of lubricant pressure.

Another object of the invention is to provide an improved lubricating system in which the oil pressure will be so governed that it will be maintained nearly proportionate to speed over the normal engine speed range, reaching maximum pressure at preferably approximately maximum engine speed.

Another object of the invention is to provide for the by-passing of all excess oil above the maximum pressure from engine bearings, even though the viscosity of the oil may vary widely.

Another object of the invention is to provide, in a unitary mechanism, adjusting means therefor to vary the responsiveness of the mechanism to control the lubricating pressure and also to predetermine the amount of lubricant permitted to by-pass from the system at all times independent of engine speed.

Other objects of my invention and the invention itself will be better understood by reference to the following description of an embodiment of the invention, in which description reference will be had to the accompanying drawings forming a part of this specification and illustrating the said embodiment.

Referring to the drawings:

Figure 1 shows a transverse section through an automotive engine and an embodiment of the invention applied thereto;

Figure 2 is an enlarged detail view in section of the said embodiment in an actuated position.

Figure 3 is a transverse section taken on the line 3—3 of Figure 2.

Referring now first to Figures 1 and 3, a portion of a crank case of an automotive engine is generally illustrated at 1, to which there is secured an oil pan 2, adapted to hold a supply of oil for lubricating of the wearing parts of the engine. Within the crankcase and mounted in any suitable manner there is an oil pump 3, adapted to draw the lubricant through a conduit 4, from the oil pan and to discharge it through a conduit 5, and branches thereof, one of which is shown at 6, and others of which are shown at 7 and 8, to the various bearings of the automotive engine to be supplied with lubricant from the pump. In a branch of the conduit 6, or as shown with one of the branches 8, thereof, a by-pass conduit is provided which comprises an approach portion 10, and a discharge portion 11, interconnected by a valve mechanism adapted to variably restrict the flow of fluid from the approach to the discharge portion of the by-pass conduit. This mechanism comprises a cylinder 13, screw threaded at 14, into a cylindrical recess 15, of a wall of the crank case 1, and preferably as illustrated, integral therewith.

The conduit 10, is adapted to communicate with the interior of the recess 15 through a valve comprising a seat 16, and a piston 17, provided with a valve element 17ª. The valve element 17ª, is yieldingly pressed into engagement with the seat 16, preferably by a helical spring 18, one end of which spring seats against a shoulder 19, on the valve element, and the other end of which seats against a shoulder 20, on the outer surface of the cylinder 13. The piston 17, is movable against the force of the spring 18, by the effect of lubricant pressure in the conduit 10, exerted against its forward face or valve element 17ª, and an outwardly extending piston rod or stem 21, making sliding engagement with the inner walls of the cylinder 13, guides the piston as it is reciprocated by the differential effects of the spring 18, and the fluid pressure exerted against the valve 17ª.

A clamping nut 22, adapted to be advanced against the outer face of the crankcase locks the cylinder 13, in position with its forward portion projected within the recess as shown. By loosening the nut 22, and by virtue of the screw-threaded engagement with the walls of the recess, the cylinder may be advanced or retracted to increase or decrease the pressure of the spring upon the piston. The piston 17, has a longitudinal bore extending throughout its length and terminating at its inner end with a restricted portion in which a valve seat 23 is formed. Within this longitudinal bore there is a needle valve 24, secured at its outer end by threaded engagement with the inner wall of the bore, and retained in desired adjustment by the jam nut 25. The inner end of the needle valve 24, has an enlarged guiding portion 26, contacting with the walls of the bore to align the conical end of the needle valve with the valve seat 23. By adjusting the needle valve 24, the fluid flow between the conical end of the valve and the adjacent walls of the valve seat 23, may be regulated to admit a predetermined volume of lubricant to by-pass the needle valve or to restrict the flow therethrough.

Through a lateral wall of the piston stem 21, and forwardly of the enlarged portion 26, of the needle valve 24, openings 27, are provided to permit the lubricant to flow therethrough and to pass therefrom through the conduit 11, to the oil pan 2. A key slot 28, and key pin 29, are provided at the outer end of the valve element 17ª, to prevent it from rotating relative to the cylinder 13, and thereby causing the nut 25, to become loosened from locking engagement with the said valve element 17ª, and modify the needle valve adjustment.

The inner end of the piston 17, may have its forward face 17ª, variously formed to co-operate with the valve seat 16, and to be acted upon by the pressure of lubricant, but it is preferably frustro-conical in form, as shown, and co-operated with a valve seat whose seating surface is preferably complemental in form. The orifice within the valve seat, however, is preferably of such a diameter that the valve element 17ª, when seated, will extend within the engaged portion of the valve seat, thus subjecting a relatively small portion of the area of the valve element 17ª, to the pressure of lubricant in the conduit 10. When, however, the valve is moved to the position shown in Figure 2, the pressure exerted against the forward face of the piston is effective over all portions of the forward face of the valve element 17ª.

The system, comprising the apparatus above described, operates as follows: Assuming that oil has been supplied to the oil pan 2, and that the engine and oil pump 3, are in operation, oil will be drawn from the pan and supplied under pressure, to the conduits leading from the pump such as the conduits 5, 6, and 7, and the passages 8 and 10, to the forward face of the valve element 17ª.

Now, assuming that the pressure of lubricant is of such a low value as to be insufficient to move the piston against the counter pressure of the spring 18, the only flow from the conduit 10, to the discharge conduit 11, will be such flow as may be effected through the opening provided by the needle valve 24, and the opening 27, the valve restricting the flow therethrough commensurate with its adjustment. Under this condition, lubricant will be continuously by-passed around the lubricant supply conduits of the system, such as the conduits 5, 6 and 8, and will be returned to the crank case oil pan and withdrawn therefrom in a continuous cycle at the same time that lubricant is being supplied to the bearings. As the speed of the engine increases, the pump 3, will be more and more effective to increase the pressure of lubricant delivered therefrom until a value of lubricant pressure is effected which, communicated against the forward face of the piston 17, will be effective to overcome the force of the spring 18, and move the valve piston rearwardly from the valve closing position illustrated in Figure 1, to the position illustrated in Figure 2, or intermediate thereof, depending upon the amount of fluid pressure generated by the pump. As the piston 17, moves rearwardly, it will permit a greater flow of lubricant from the approach conduit 10, to the discharge conduit 11, and thereby by-pass such greater amount of lubricant from the bearings and the lubricant system to reduce the amount of oil supplied to the bearings and other parts of the engine and to reduce the amount of lubricant pressure effective to actuate the gauge 39, which indicates the pressure of the lubricant in the system on the discharge side of the pump.

Ordinarily when the pressure is increased sufficiently to move the valve piston 17, the initial movement will be very slight and will only provide an opening through the valve for the venting of lubricant to the bypass conduit 11, and such venting will be effective to reduce the rate of increase of pressure in the system and a balance will be reached between such reduced pressure of lubricant in the system and the spring 18, wherein the piston 17, will be held in an intermediate position acted upon differentially by the force of the spring 18, and the pressure of lubricant against its forward face, and which pressure will be increased the moment the valve element piston 17$^a$ leaves its seat, due to the greater area of its face presented to the effect of fluid pressure. As before stated, by rotating the cylinder 13 after loosening the nut 22, the cylinder may be advanced or retracted to increase or decrease the pressure of the spring 18, and such action will be effective to increase or decrease, respectively, the effective lubricant pressure required to overcome the power of the spring, so that as the position of the cylinder within the recess is adjusted, one may provide for the venting or by-passing of lubricant from the system to reduce its pressure at different predetermined values of fluid pressure. This same effect may be accomplished to some extent by the longitudinal adjustment of the needle valve 24, as before described, whereby normally there will be by-passed from the system a certain amount of the lubricant contained under pressure therein. It is to be noted that when the valve piston has been moved to an open position that the opening controlled by the needle valve will be less effective to by-pass lubricant from the system, since its approach portion will be then disposed in the system at a point substantially less in pressure.

By disposing the valve mechanism within a recess in the wall of the crankcase, as illustrated and described, the mechanism may be removed as a unit for the purposes of cleaning and repairing but with a minimum effort on the part of the person undertaking so to do. Also, an equally advantageous characteristic of the mechanism resides in its unitary construction which permits its removal from the engine for the purpose of testing and adjusting the spring tension and needle valve setting in an apparatus arranged substantially like that of the engine and provided with instruments for determining the operative efficiency of the valve mechanism.

Having thus described my invention in differing embodiments, I am aware that the same may be practiced in embodiments varying widely from those herein illustrated and described but without departing from the spirit of the invention.

I claim:

1. In a mechanism for regulating the pressure in the lubricating system of an automotive engine, the combination with an engine crank case, of a source of lubricant under pressure, a plug screw-threaded into a wall of the crank case and comprising a spring pressed check valve movable towards open position according to the pressure of lubricant to by-pass lubricant from the source to the crankcase, said plug having a duct for fluid flow extending from its first said face to the said conduit second portion, said duct adapted to by-pass a portion of the lubricant flow, and means adjustable from the exterior of the casing for varying the resistance to flow through the said duct, said means comprising a rod positioned within a longitudinal bore of the piston and reciprocable therein and guided by the walls thereof, to have a portion projected within a restricted part of the said duct to vary the resistance to flow therethrough according to the degree of projection of the said portion within the said restricted part, said restricted portion and said bore being disposed axially of the said piston, said piston comprising a stem extending outwardly through the cylinder to the exterior of the casing.

2. In a mechanism for regulating the pressure in the lubricating system of an automotive engine, the combination with an engine crank case, of a source of lubricant under pressure, a plug screw-threaded into a wall of the crank case and comprising a spring pressed check valve movable towards open position according to the pressure of lubricant to by-pass lubricant from the source to the crank case, said plug having a duct for fluid flow extending from its first said face to the said conduit second portion, said duct adapted to by-pass a portion of the lubricant flow, and means adjustable from the exterior of the casing for varying the resistance to flow through the said duct, said means comprising a rod positioned within a longitudinal bore of the piston and reciprocable therein and guided by the walls thereof, to have a portion projected within a restricted part of the said duct to vary the resistance to flow therethrough according to the degree of projection of the said portion within the said restricted part, said restricted portion and said bore being disposed axially of the said piston, said piston comprising a stem extending outwardly through the cylinder to the exterior of the casing, and a plate adapted to fit over the end of the cylinder to prevent the end of the stem being struck by extraneous objects.

3. In a mechanism for regulating the pressure in the lubricating system of an automotive engine, the combination with an engine crank case, of a source of lubricant under pressure, a plug screw-threaded into a wall of the crank case and comprising a cylinder, a piston reciprocable therein, said crank case wall having a lubricant conduit through a portion thereof and comprising a portion leading from the said source to a face of the piston, and a portion leading from the cylinder, said piston being spring-pressed toward a position to restrict flow of fluid under pressure from the said first portion to the said second portion of the lubricant conduit, and being responsive to the effect of lubricant pressure exerted against its said face to decrease the restrictive effect exerted upon such lubricant flow, said plug having a duct for fluid flow extending from its inner end to the said conduit second portion, said duct adapted to by-pass a portion of the lubricant flow.

4. In a mechanism for regulating the pressure in the lubricating system of an automotive engine, the combination with an engine crank case, of a source of lubricant under pressure, a plug screw-threaded into a wall of the crank case and comprising a cylinder, a piston reciprocable therein, said crank case wall having a lubricant conduit through a portion thereof and comprising a portion leading from the said source to a face of the piston, and a portion leading from a lateral wall of the cylinder, said piston being spring-pressed toward a position to restrict flow of fluid under pressure from the said first portion to the said second portion of the lubricant conduit, and being responsive to the effect of lubricant pressure exerted against its said face to decrease the restrictive effect exerted upon such lubricant flow, said plug having a duct for fluid flow extending from its inner end to the said conduit second portion, said duct adapted to by-pass a portion of the lubricant flow, and means adjustable from the exterior of the casing for varying the resistance to flow through the said duct.

5. In a mechanism for regulating the pressure in the lubricating system of an automotive engine, the combination with an engine crank case, of a source of lubricant under pressure, a plug screw-threaded into a wall of the crank case and comprising a cylinder, a piston reciprocable therein, said crank case wall having a lubricant conduit through a portion thereof and comprising a portion leading from the said source to a face of the piston, and a portion leading from the cylinder lateral wall at an intermediate portion thereof, said piston being spring-pressed toward a position to restrict flow of fluid under pressure from the said first portion to the said second portion of the lubricant conduit, and being responsive to the effect of lubricant pressure exerted against its said face to decrease the restrictive effect exerted upon such lubricant flow, said plug having a duct for fluid flow extending from its inner end to the said conduit second portion, said duct adapted to by-pass a portion of the lubricant flow, the resistance to fluid flow through the said duct being at all times independent of the movements of the piston.

In testimony whereof I hereunto affix my signature this 23 day of April, 1926.

FERDINAND JEHLE.